Nov. 15, 1932.  L. MYERS  1,887,656
BATTERY TESTING INSTRUMENT
Filed Aug. 27, 1928   5 Sheets-Sheet 1

INVENTOR.
Lawrence Myers
BY Williams, Bradbury,
McCaleb & Hinkle
ATTORNEYS.

Nov. 15, 1932.          L. MYERS          1,887,656
BATTERY TESTING INSTRUMENT
Filed Aug. 27, 1928          5 Sheets-Sheet 3

INVENTOR.
Lawrence Myers
BY Williams, Bradbury,
McCalla & Kinkle
ATTORNEY.

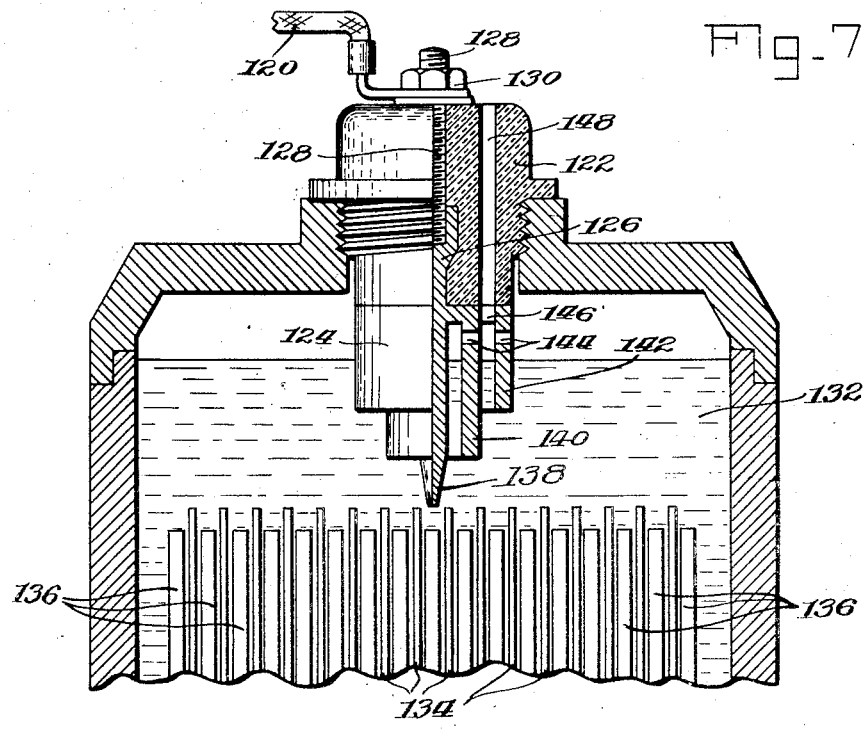
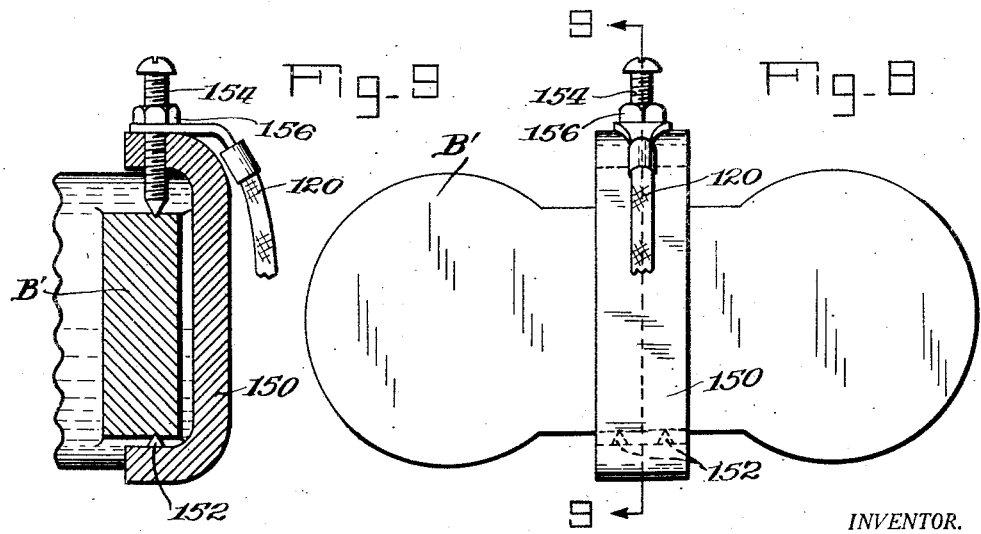

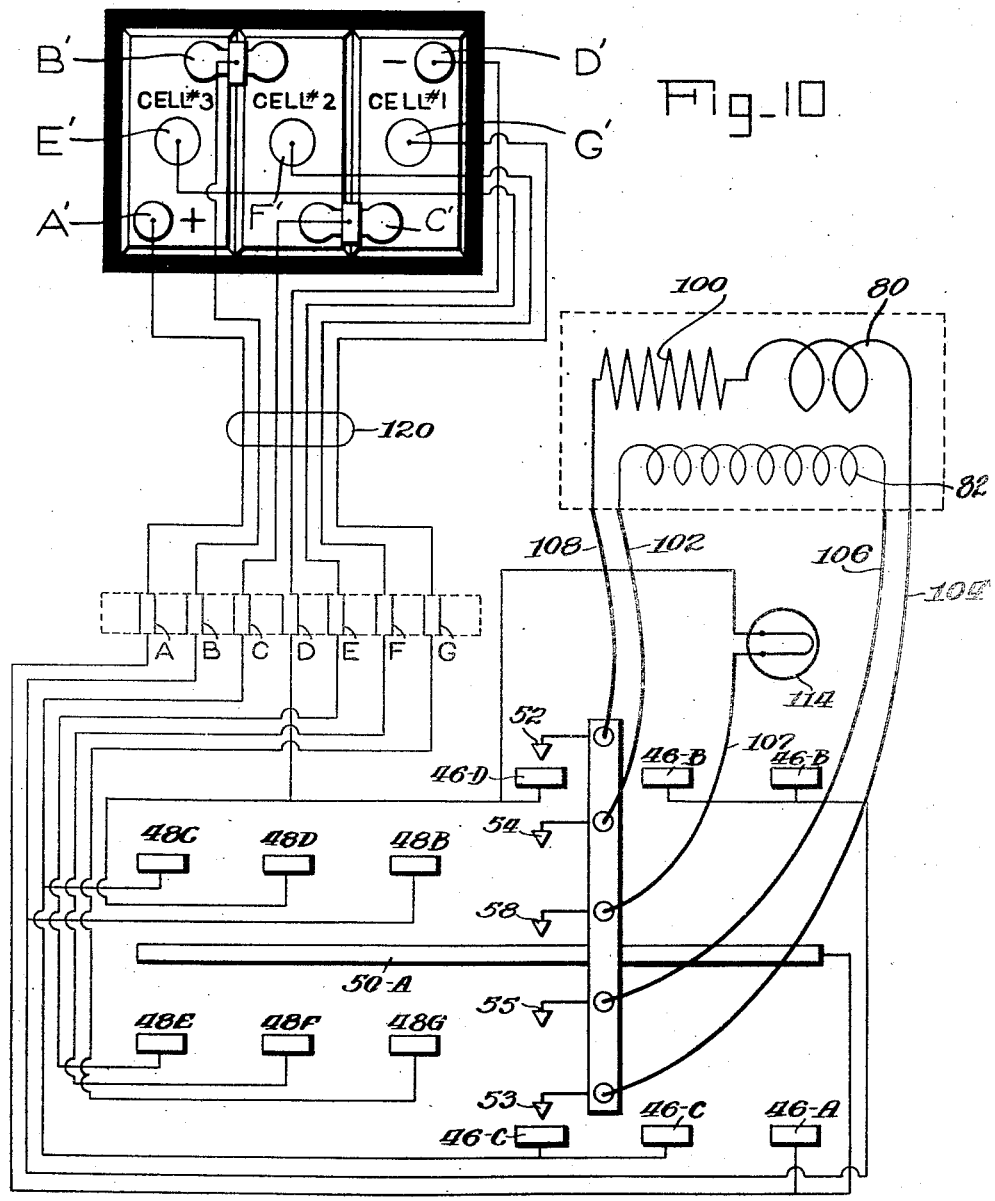

Patented Nov. 15, 1932

1,887,656

UNITED STATES PATENT OFFICE

LAWRENCE MYERS, OF CHICAGO, ILLINOIS

BATTERY TESTING INSTRUMENT

Application filed August 27, 1928. Serial No. 302,386.

My invention relates to a device for indicating at some remote place the height of an electrolyte in an electrical cell and the electrical charge or electrochemical condition of that cell and more specifically to obtaining an indication on the dashboard of an automotive vehicle of the electrolyte level and the charge of any one of the individual cells of a storage battery composed of a plurality of series connected cells.

One of the objects of my invention is to provide a selective switch to test all cells individually for both electrolyte level and charge and by which an open circuit may be maintained except at actual times of test.

Another object is to provide a double wound ammeter which will give readings both of electrolyte level and of charge on the same dial.

Another object is to provide a cheap and easily attachable electrode and one which may be used in indicating not only the presence of the electrolyte above the plates of the battery cell but also the depth of the electrolyte above the plates.

Other objects and advantages of my invention will appear more fully from the following description and accompanying drawings, in which similar characters of reference indicate similar parts throughout the several views.

In the drawings,

Fig. 7 is a cross sectional view showing the upper portion of a storage cell, the electrode being shown in quarter section as substituted for the usual filling plug;

Fig. 8 is a plan of the clamp for fastening the wires to the intermediate straps of the storage battery;

Fig. 9 is a cross sectional view of the same taken through the line 9—9 of Fig. 8; and Fig. 10 is a schematic diagram showing the wiring, connections, contacts and other electrical parts.

In general my invention comprises a selective switch, by means of which a closed circuit may be established between the poles of any desired cell of a multicell storage battery through one winding of a double wound galvanometer or ammeter to indicate the degree of charge or voltage of that cell.

The aforementioned selective switch may also be used to complete a circuit between an improved electrode substituted for the usual filling plug and the opposed pole of the next adjoining cell through the other winding of the aforementioned ammeter to indicate the height of the electrolyte in any one of the cells.

The electrode of my invention is so constructed, as will appear more fully hereinafter, that any slight variation in height of the electrolyte will cause a wide variation in the area of the electrode in contact with the liquid. In this way a variable resistance is provided in this circuit which will provide an indicator reading of the aforementioned ammeter varying inversely with this resistance and thus varying directly with the height of the electrolyte.

Figure 1:
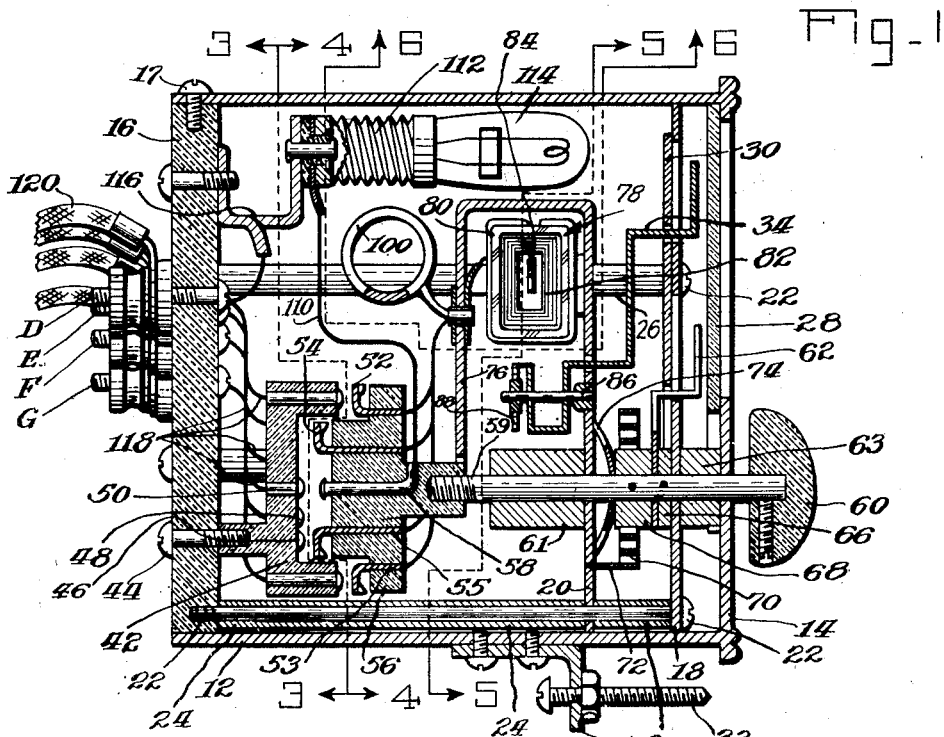
Fig. 1 is a medial vertical cross section of my improved testing instrument comprising a selective switch, ammeter indicator dial, electric lamp, and including casing for same, taken on the line 1—1 of Fig. 2.
Figure 2:
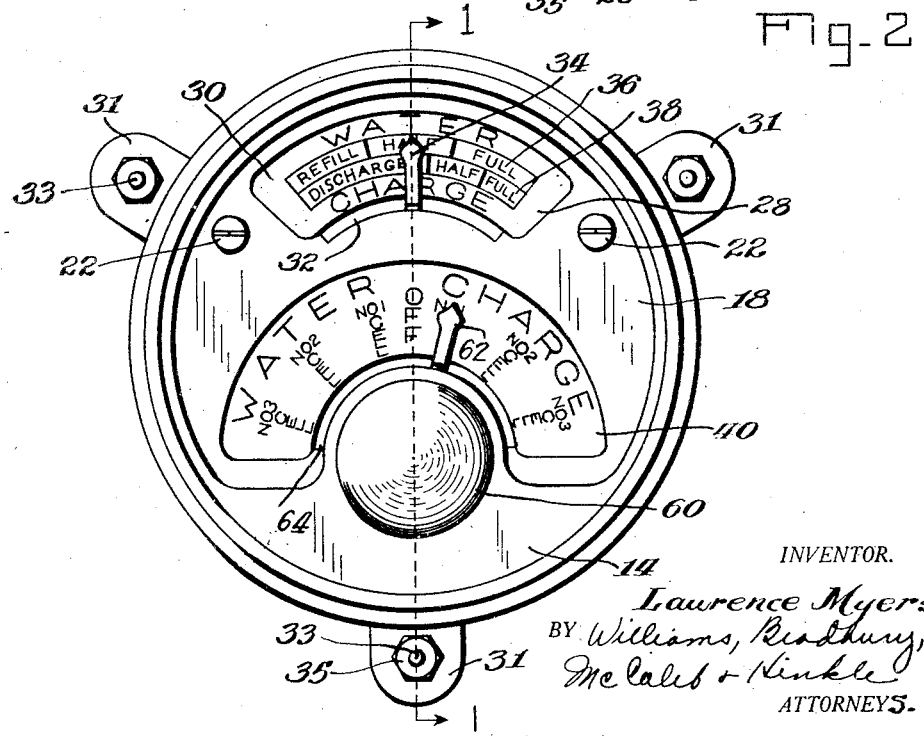
Fig. 2 is a front elevation of the instrument.

Referring to Figs. 1 and 2, the instrument proper of my invention is enclosed within a cup-shaped casing comprising a cylindrical wall 12 formed integrally with a face 14 and secured to a back plate 16 by screws 17. The parts 12 and 14 may be drawn from suitable sheet metal or molded from a phenol condensation product or other suitable material. Partitions 18 and 20 are carried by the back plate 16, being secured thereto by screws 22 and spaced therefrom by suitable tubular separators 24 and 26.

A glass plate 28 is secured beneath a crescent-shaped opening formed in the face 14 and a celluloid sheet 30 is mounted over a suitable opening formed in the partition 18. The sheet 30 has an arcuate slot 32 formed therein to permit passage therethrough of an indicating needle 34 which is adapted to register with the indicia "Refill", "Half", "Full", and "Discharge", "Half", "Full", marked upon the sheet 30 and forming dials 36 and 38, respectively. The dial 40 is also marked upon the sheet 30 to register the position of the selecting switch as will hereinafter more fully appear.

The instrument as a whole may be attached to the instrument board of an automotive vehicle by means of brackets 31. Screws 33, threaded in the brackets 31 and lock nuts 35, provide convenient adjustable means to attach the instrument to either metal or wood instrument boards.

The selecting switch comprises a stationary insulating block 42 secured by screws 44 to the back plate 16. Diametrically opposed pairs of contact points 46 and 48 and a central contact point 50 are imbedded in the block 42.

Each pair of contact points 46 and 48 is adapted selectively to make contact with suitable contact points 52, 53 and 54, 55, respectively, carried in a movable insulating block 56. A central contact point 58 in the block 56 is adapted to contact with the point 50. The insulating blocks 42 and 56 are normally separated so that all contacts are open. The movable block 56 is carried by a shaft 59 which is rotatable and longitudinally movable in the casing, being journaled in suitable holes formed in the face 14 and partition plates 18 and 20 and in bearing boxes 61 and 63 attached to said plates.

A handle knob 60 which is rigidly secured at the outer end of the shaft 59 is provided for manipulation of the movable block 56 which is preferably threaded to the inner end of said shaft. A pointer 62 cooperating with the dial 40 passes through a slot 64 formed between the lower edge of the sheet 30 and the upper edge of the partition 18 and is adapted to register with the dial 40. The pointer 62 is rigidly secured to the shaft 59 between a pair of collars 66 and 68 which may be pinned to the shaft 59.

A spiral spring 70 has one end anchored to the partition 20 by a pin 72 and its inner end secured to the collar 68. This spring will tend always to return the shaft 59 to normal position; that is, the position in which the pointer 62 is in the vertical or "off" position.

A suitable concave split spring washer 74 is compressed between the partition 20 and the collar 68, tending normally to urge the shaft to the right (Fig. 1) with the collar 66 abutting against the partition 18.

Figure 5:
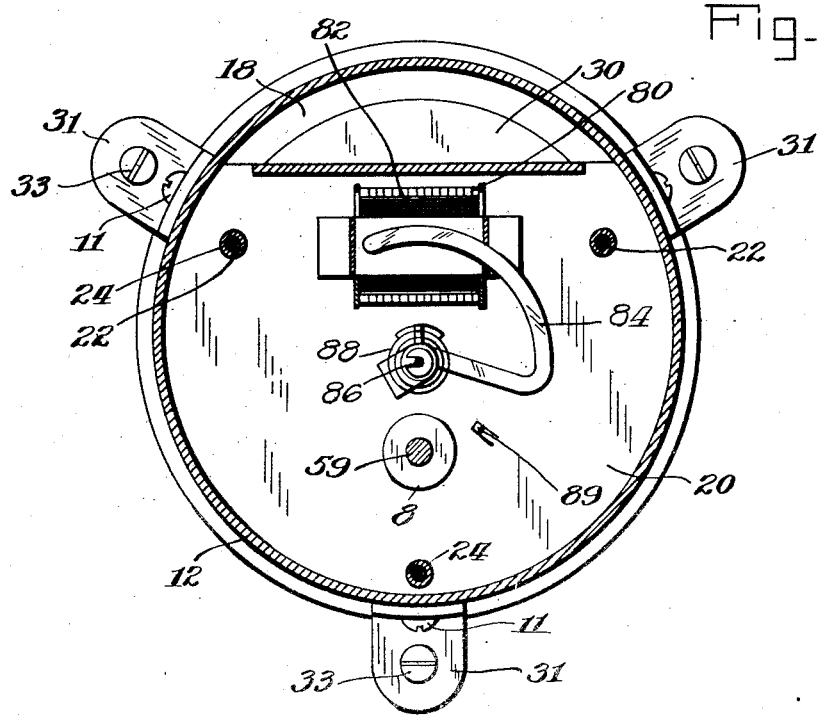
Fig. 5 is a cross sectional view taken on the line 5—5 of Fig. 1 and looking toward the front.
Figure 6:
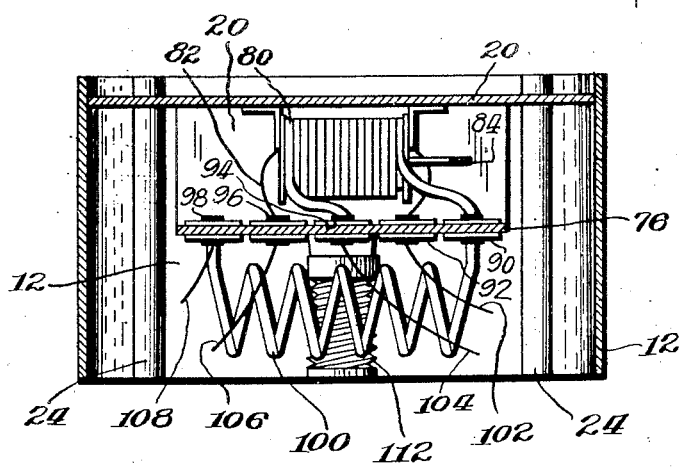
Fig. 6 is a transverse sectional view showing the ammeter windings and taken on the line 6—6 of Fig. 1.

The upper portion of the partition 20 is bent rearwardly and then downwardly to form a guard plate and support 76 for a galvanometer designated generally at 78. The galvanometer is constructed like a plunger type ammeter and is therefore referred to as such herein. It comprises windings 80 and 82 surrounding an arcuate plunger 84 (Fig. 5) which may be formed integrally with the indicating needle 34 (Fig. 1) and journaled upon a pin 86 suitably fixed to the partition 20.

Figure 4:
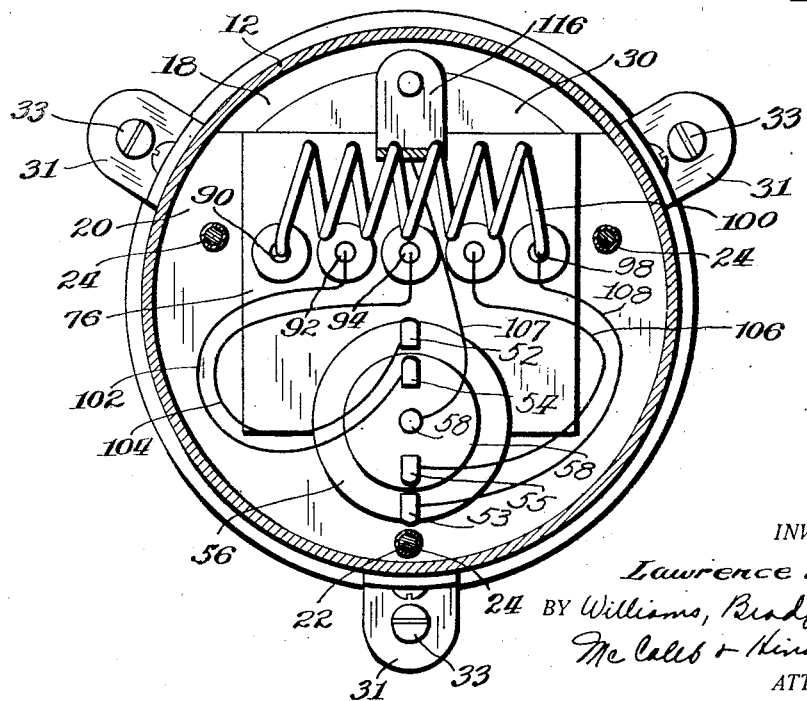
Fig. 4 is a cross sectional view taken on the line 4—4 of Fig. 1 and looking toward the front.

A hair spring 88 acts in the usual manner to resist displacement of the plunger 84 by the electromagnetic forces induced by passage of an electric current through windings 80 and 82 and to return the plunger to normal position where it is arrested by a stop 89 punched from the partition 20. The ends of the windings 80 and 82 are attached to insulated connectors 90, 92, 94, 96 and 98 carried in the portion 76 of the partition 20 (Fig. 4). The end connectors 90 and 98 are connected by a resistance wire 100 which serves as a means to reduce the current flow through the winding 80 sufficiently to prevent overheating thereof. As best shown in Fig. 4, the connectors 92, 94, 96 and 98 are connected by flexible conductors or leads 102, 104, 106 and 108 to the contact points 54, 52, 55 and 53, respectively, mounted upon the movable block 56. A flexible wire 107 connects the central contact 58 of the movable block with a socket 112 adapted to receive an electric lamp 114. The socket 112 is carried by a conducting bracket 116 secured to the back plate 16.

Figure 3:
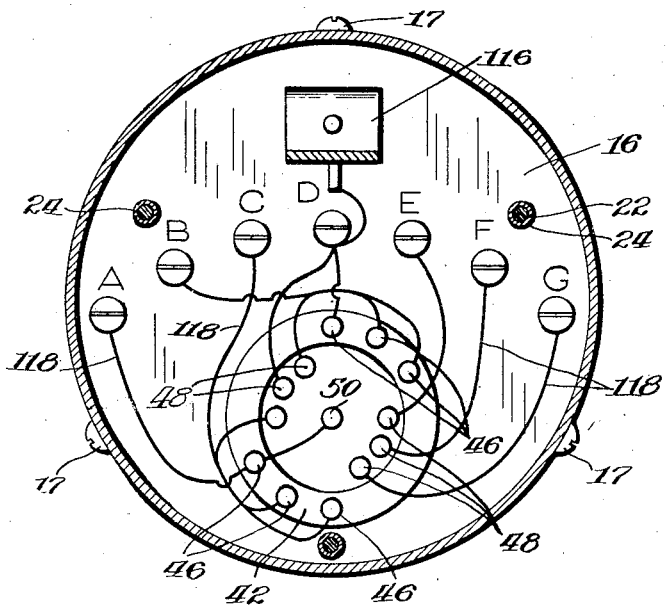
Fig. 3 is a cross sectional view taken on the line 3—3 of Fig. 1 and looking toward the rear.

The bracket 116 is connected to a binding post D secured to the back plate 16. Other binding posts A, B, C, E, F and G are connected by suitable leads 118 to the stationary contact points 46, 48 and 50, as shown in Fig. 3.

The battery to be tested is connected to the binding posts A to G by suitable conductors 120 which lead from the various terminals of the battery and from electrodes substituted for the filling plugs of the battery, as indicated in Fig. 10, as will be more fully described hereinafter. For convenience the various points of connection on the battery have been indicated by the prime of the letter of the binding post to which they are connected; i. e., the binding post G is connected to the electrode G', the binding post F is connected to the electrode F', etc., and the contact points by their reference character with the letter of the binding post to which the contact is connected.

Each of the electrodes is supported by a plug 122 of suitable insulating material which is threaded so as to be adapted to be screwed into the usual filling aperture of a storage battery cell. The electrode comprises an electrode element 124 which has a stem 126 preferably molded within the plug 122 and tapped to receive a stud 128 to which the wire 120 may be secured by a nut 130.

The electrode element 124 is adapted to project into the electrolyte 132 within the cell of the battery to approximately the level of the tops of separators 134 for the battery plates 136. The element 124 has a central downwardly projecting portion 138 and two concentric hollow cylindrical skirt portions 140 and 142 of graduated length. Suitable gas relief openings 144 are formed in the cylindrical portions 140 and 142 to permit the gas to escape from the spacing between the skirt portions through an opening 146 formed in the electrode element 124. The opening 146 is in registry with a drilled air vent passageway 148 formed in the plug 122.

The binding posts B and C are connected to straps B' and C' by clamps 150 shown in Figs. 8 and 9. These clamps are preferably made of lead coated metal and are substantially U-shaped to fit over the narrow portion of the strap having a plurality of points 152 which may be forced partially into the strap by a screw 154 which is also pointed at its innermost end and threaded through the strap, the screw being locked in position by a nut 156 which also serves as a means for clamping the wire 120 to the clamp 150.

Assuming that the instrument has been properly installed and connected by means of the wires 120 (which are preferably grouped together to form a cable) with the poles of the battery cells and to the above described electrodes, as indicated in Fig. 10, the device will operate as follows:

Assume first that it is desired to determine the height of the electrolyte in cell No. 1. The knob 60 will be rotated to the left from the "off" position until its pointer 62 registers with the marking "No. 1 cell" and pushed inwardly. A circuit will thus be established from the strap B', binding post B, contact 48—B, contact 54, flexible lead 102, through the winding 82 of the ammeter, flexible lead 106, contact point 55, contact point 48—G, binding post G, to the electrode G'. (It will be understood that whereas the switch is rotatable to select the desired contact points, Fig. 10, for clearness, diagrammatically illustrates the switch as horizontally slidable.)

The current generated in cell No. 2 will thus flow through the circuit above traced, and the strength of the current will depend upon the depth of the electrolyte in cell No. 1. Since as the depth of the electrolyte above the plate separators 134 is lowered, the area of contact between the electrolyte and the electrode element 124 will decrease, thereby increasing the contact resistance between the electrode element and electrolyte in inverse proportion.

The surface area of electrode element 124 is such that the current flow through the electrode is substantially directly proportional to the depth of the electrolyte above the separator plates, and increments in electrolyte height will cause corresponding increments in the indication made by the needle 34.

Upon operating the switch, as above described, the ammeter will register the amount of electrolyte in cell No. 1 by indicating whether it is "Full", "Half full", or whether the battery should be supplied with additional distilled water, i. e., "Refill".

The depth of the electrolyte in cell No. 2 may be determined in a similar manner by turning the knob 60 further counterclockwise so that the pointer 62 is in registry with the indicia "No. 2 cell". When the switch is thus positioned and pushed inwardly the winding 82 of the ammeter is connected between the electrode F' and the pole D', the charge in cell No. 1 being utilized to cause current flow. In a similar manner the depth of the electrolyte in cell No. 3 is determined by connecting the ammeter across the electrode E' and the strap C', in which instance the charge in cell No. 2 is utilized to actuate the ammeter.

Each time the knob 62 is pushed inwardly the contact 58 engages the contact 50—A thereby completing a circuit from the positive pole A' of the battery, through binding post A, contact 50—A, contact 58, flexible lead 107, electric lamp 114, binding post D, to the negative pole of the battery D'. The lamp 114 thus illuminates the dials 36, 38 and 40 since the sheet 30 is of translucent material, making the indication of the indicator needle 34 and pointer 62 readily discernible.

Upon release of the handle knob the above described circuits are automatically broken since the handle is pushed outwardly by the spring 74, and the pointer 62 returned to normal "off" position by the spring 70.

When it is desired to determine the charge of a cell of the battery, the knob is turned to the right until the pointer 62 is in registry with the indicia for the cell desired to be tested and the handle pushed inwardly to complete the circuit. Assuming that cell No. 1 is to be tested the knob is rotated to "No. 1 cell" and pushed inwardly, thereby completing a circuit from the pole D', through binding post D, contact 46—D, contact 52, flexible lead 108, resistance 100, winding 80, flexible lead 104, contact 53, contact 46—C, binding post C, to the strap C' which is of course connected to the positive pole of cell No. 1.

In a manner similar to that above described the charges in the cells Nos. 2 and 3, may readily be determined, the ammeter winding 80 being of course connected across the poles of the cell to be tested by actuation of the switch.

From the above description of my invention, it will be seen that I have provided an extremely simple instrument capable of performing a large number of testing operations. The instrument may readily be utilized on any automotive vehicle, motor-boat or in fact any place where a storage battery is used and kept in a comparatively inaccessible place, to determine exactly the condition of each individual cell of the battery. As previously stated, the electrode may be substituted for the usual filling opening plug so that no changes in the battery need be made. Since all of the contacts of the switch are normally open the testing instrument does not utilize current except when operated.

Through the use of the instrument of my invention the care of a storage battery is greatly simplified so that the ordinary layman may keep the battery in proper condition. It is of course a well-known fact that a battery which is at all times kept properly charged and in which the electrolyte is maintained at the proper level will have a useful life many times longer than that of a similar battery which is given only superficial attention such as is usually bestowed upon it by the ordinary automobile owner.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. In a battery testing device, the combination of a multicell storage battery, an electrode depending into each of the cells of said battery, an ammeter, open circuits between each of said electrodes, the opposite pole of the cell adjacent the one containing the electrode, and said ammeter, and switch means selectively to close said circuits.

2. In an instrument of the class described, the combination of a series connected multicell storage battery, an electrode threaded into the filling opening of each cell of said battery and projecting downwardly substantially to the level of the tops of the separator plates of the cell, an electrical current flow indicator, and selective switch means to connect said indicator between the electrodes of one of said cells and the opposed pole of the next adjacent cell.

3. In a testing instrument for multicell storage batteries having an electrolyte, the combination of a double wound ammeter having an indicating needle, charge and electrolyte level dial scales cooperating with said needle, pairs of contact points adapted to be connected to the poles and to the electrolyte in each of the individual cells of the battery to be tested, a selective manually operable switch arranged to connect a pair of said contact points to one of the windings of said ammeter to indicate the degree of charge of one of the cells on said dial scale and to connect another pair to the other winding of said ammeter to indicate the electrolyte depth in said cell, and a pointer connected to said switch to indicate the scale to be read.

4. In a storage battery testing instrument, the combination of a multicell series connected storage battery, an ammeter, an electrode mounted in the filling openings of each of the cells of said battery and depending to substantially the level of the tops of the plates of the cell, said electrode being shaped to have a relatively large surface area in contact with the electrolyte when the level of the electrolyte is high and a disproportionately small surface area in contact with the electrolyte when the electrolyte level is low, and means for selectively connecting any one of said electrodes and an opposite pole of an adjacent cell to said ammeter, thereby to obtain an indication by said ammeter of the height of the electrolyte in the cell.

In witness whereof, I hereunto subscribe my name this 25th day of August, 1928.

LAWRENCE MYERS.